US011302061B2

(12) United States Patent
Maeda

(10) Patent No.: US 11,302,061 B2
(45) Date of Patent: Apr. 12, 2022

(54) IMAGE PROCESSING APPARATUS AND METHOD, FOR GERNERATION OF A THREE-DIMENSIONAL MODEL USED FOR GENERATING A VIRTUAL VIEWPOINT IMAGE

(71) Applicant: CANON KABUSHIKI KAISHA, Tokyo (JP)

(72) Inventor: Mitsuru Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/252,479

(22) Filed: Jan. 18, 2019

(65) Prior Publication Data
US 2019/0228563 A1    Jul. 25, 2019

(30) Foreign Application Priority Data
Jan. 22, 2018 (JP) .............................. JP2018-008047

(51) Int. Cl.
G06T 15/20 (2011.01)
G06T 7/55 (2017.01)
G06T 15/40 (2011.01)
H04N 13/111 (2018.01)

(52) U.S. Cl.
CPC ............... *G06T 15/20* (2013.01); *G06T 7/55* (2017.01); *G06T 15/40* (2013.01); *H04N 13/111* (2018.05); *G06T 2207/10028* (2013.01); *G06T 2207/20224* (2013.01); *G06T 2207/30221* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 5,086,495 A | * | 2/1992 | Gray | G06T 17/20 345/420 |
| 5,760,778 A | * | 6/1998 | Friedman | G06K 9/468 345/420 |
| 6,556,198 B1 | * | 4/2003 | Nishikawa | G06T 17/20 345/420 |
| 6,674,894 B1 | * | 1/2004 | Parker | G06T 11/008 345/419 |
| 8,531,457 B2 | * | 9/2013 | Katz | G06T 15/40 345/419 |
| 10,152,771 B1 | * | 12/2018 | Li | G06K 9/00201 |

(Continued)

FOREIGN PATENT DOCUMENTS

| JP | 2010152535 A | 7/2010 |
|---|---|---|
| JP | 2012208719 A | 10/2012 |

(Continued)

*Primary Examiner* — Jason A Pringle-Parker
(74) *Attorney, Agent, or Firm* — Canon U.S.A., Inc. IP Division

(57) ABSTRACT

An image processing apparatus includes an acquisition unit configured to acquire a three-dimensional shape data of an object based on images captured by a plurality of cameras, a generation unit configured to generate information based on a relationship between the three-dimensional shape data acquired by the acquisition unit and positions of the plurality of cameras, and a correction unit configured to correct the three-dimensional shape data based on the information generated by the generation unit.

11 Claims, 11 Drawing Sheets

(56) References Cited

U.S. PATENT DOCUMENTS

| | | | | |
|---|---|---|---|---|
| 2002/0164067 | A1* | 11/2002 | Askey | G06K 9/32 382/154 |
| 2005/0151734 | A1* | 7/2005 | Gubkin | G06T 9/001 345/424 |
| 2010/0238271 | A1* | 9/2010 | Pfeiffer | A43D 1/06 348/46 |
| 2012/0256916 | A1* | 10/2012 | Kitamura | G01B 11/24 345/419 |
| 2013/0249901 | A1* | 9/2013 | Sweet | G06T 17/00 345/419 |
| 2014/0043436 | A1* | 2/2014 | Bell | H04N 13/156 348/46 |
| 2014/0098094 | A1* | 4/2014 | Neumann | G06T 17/10 345/420 |
| 2016/0125577 | A1* | 5/2016 | Wu | G06K 9/46 382/195 |
| 2017/0004649 | A1* | 1/2017 | Collet Romea | G06T 17/00 |
| 2018/0096463 | A1* | 4/2018 | Kim | G06T 17/00 |

FOREIGN PATENT DOCUMENTS

| | | | |
|---|---|---|---|
| JP | 5068732 | B2 | 11/2012 |
| JP | 2016209399 | A | 12/2016 |

\* cited by examiner

FIG.10

| | 9110a | 9110b | 9110c | 9110d | 9110e | 9110f | 9110g | 9110h | LOGICAL SUM |
|---|---|---|---|---|---|---|---|---|---|
| 901 | 1 | | | | | | | | 1 |
| 902 | 1 | 1 | | | | | | 1 | 1 |
| 903 | | 1 | 1 | | | | | | 1 |
| 904 | | | 1 | 1 | | | | | 1 |
| 905 | | | 1 | 1 | 1 | | | | 1 |
| 906 | | | 1 | 1 | 1 | 1 | 1 | | 1 |
| 907 | | | 1 | 1 | 1 | 1 | 1 | | 1 |
| 908 | | | | | | 1 | 1 | | 1 |
| 909 | | | | | | | 1 | 1 | 1 |
| 910 | | | | | | | | | 0 |

IMAGE PROCESSING APPARATUS AND METHOD, FOR GERNERATION OF A THREE-DIMENSIONAL MODEL USED FOR GENERATING A VIRTUAL VIEWPOINT IMAGE

BACKGROUND

Field of the Disclosure

The present disclosure relates to an image processing apparatus, an image processing method, and a storage medium particularly suitable for generation of a three-dimensional model used for generating a virtual viewpoint image.

Description of the Related Art

In recent years, interest has focused on a technique of synchronously capturing images at a plurality of viewpoints through a plurality of cameras installed in different positions and generating a virtual viewpoint image by using the images acquired at the plurality of viewpoints through the imaging operation. Through the above-described technique for generating a virtual viewpoint image from the images captured at a plurality of viewpoints, for example, highlights of a soccer game or a volleyball game can be seen at various angles, so that the user can experience a more realistic sensation in comparison to a normal image. A technique known as "Model Based Rendering" is a technique relating to creation of a virtual viewpoint image. By the technique, a plurality of cameras is arranged to surround an object, and the plurality of cameras captures images of the same object by centering on the same point. Hereinafter, a center as an imaging target is called as a gazing point of the camera. By restoring the three-dimensional model through the above-described technique, images captured at optional viewpoints can be combined, and a position or performance of an athlete can be reproduced. Therefore, the above-described technique is also useful for sports analysis.

A three-dimensional model generation method called as a volume intersection method or a visual hull method (hereinafter, the method is uniformly referred to as "visual hull") has been known as a method for generating a three-dimensional model. In the visual hull, with respect to an object as a target of three-dimensional modeling, a silhouette of the object in the image captured by each of physical cameras is virtually and inversely projected in the object direction from a position of an optical principal point of the physical camera. As a result, a pyramidal area having the object silhouette as a cross-sectional face is formed while handling a position of the optical principal point as a vertex. Then, an overlapping area (logical product) of the pyramidal area formed at each of the physical cameras is acquired as a three-dimensional model of the object.

Further, point cloud data (point group data) is generally used as a method of expressing a three-dimensional model, and a three-dimensional model is generated by expressing an existing point by a coordinate. However, in a case where the three-dimensional model created based on the visual hull is expressed by data such as a point cloud, data of a point which cannot be seen from the outside is also retained in the point cloud data. The above data will not be necessary when the virtual viewpoint image is to be generated.

Therefore, a technique discussed in Japanese Patent No. 5068732 has been provided as a method of deleting the above-described data. By the technique, a first solid model is generated by employing the visual hull method, and a second solid model is generated by executing erosion processing on the first solid model. Further, a third solid model is generated by executing dilation processing on the first solid model, and a fourth solid model is generated by executing adaptive erosion processing on the first solid model. A maximum-flow/minimum-cut calculation unit applies a maximum-flow/minimum-cut algorithm to an area between a surface of the fourth solid model and a surface of the third solid model, and acquires a vertex group which gives a minimum sum of energy to generate a three-dimensional model.

However, with the method described in Japanese Patent No. 5068732, while a three-dimensional model is generated by physically applying a thickness to a surface thereof, data of a point which actually cannot be seen is also retained, and thus the data which is not necessary for generating the virtual viewpoint image cannot be deleted sufficiently.

SUMMARY

The present disclosure is directed to a technique for reducing a data amount of a three-dimensional model used for generating a virtual viewpoint image.

According to an aspect of the present disclosure, an image processing apparatus includes an acquisition unit configured to acquire three-dimensional shape data of an object based on images captured by a plurality of cameras, a generation unit configured to generate information based on a relationship between the three-dimensional shape data acquired by the acquisition unit and positions of the plurality of cameras, and a correction unit configured to correct the three-dimensional shape data based on the information generated by the generation unit.

Further features of the present disclosure will become apparent from the following description of exemplary embodiments with reference to the attached drawings.

BRIEF DESCRIPTION OF THE DRAWINGS

FIG. 10 is a diagram illustrating an example of visibility data.

DESCRIPTION OF THE EMBODIMENTS

Hereinafter, a suitable exemplary embodiment of the present disclosure will be described in detail with reference to the appended drawings. A configuration illustrated in the below-described exemplary embodiment is merely an example, and the present disclosure is not limited to the illustrated configuration.

Figure 1:
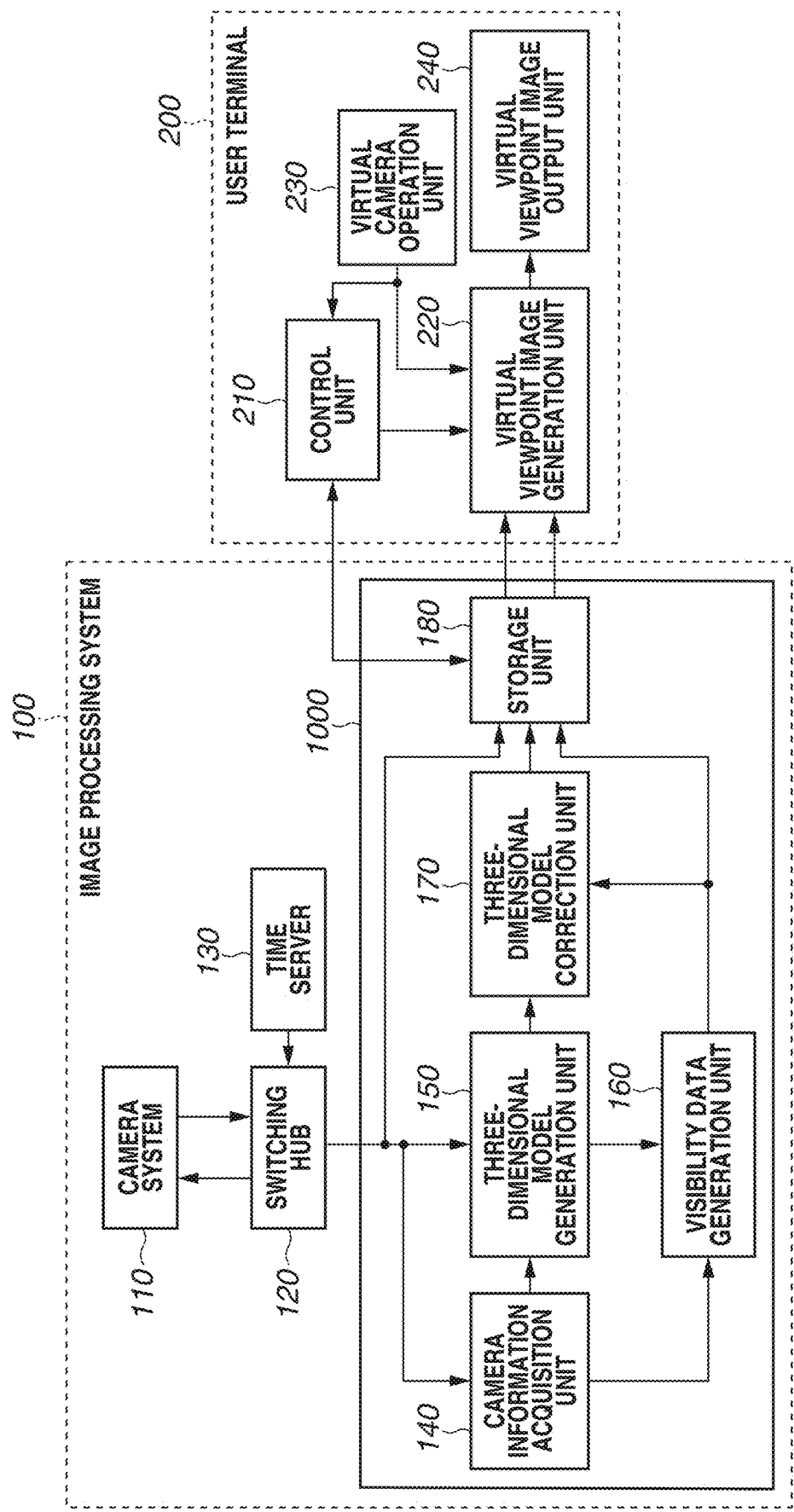
FIG. 1 is a diagram illustrating an example of a functional configuration of an image processing system according to one or more aspects of the present disclosure.

Hereinafter, a first exemplary embodiment will be described. FIG. 1 is a block diagram illustrating an example of a functional configuration of an image processing system according to the present exemplary embodiment. In the present exemplary embodiment, an image processing system for capturing images by installing a plurality of cameras in a facility such as a stadium or a concert hall will be described as an example.

In FIG. 1, an image processing system 100 includes a camera system 110, a switching hub 120, a time server 130, and an image processing apparatus 1000. The image processing apparatus 1000 includes a camera information acquisition unit 140, a three-dimensional model generation unit 150, a visibility data generation unit 160, a three-dimensional model correction unit 170, and a storage unit 180. Further, the image processing system 100 is connected to a user terminal 200. The user terminal 200 includes a control unit 210, a virtual viewpoint image generation unit 220, a virtual camera operation unit 230, and a virtual viewpoint image output unit 240.

Figure 9:
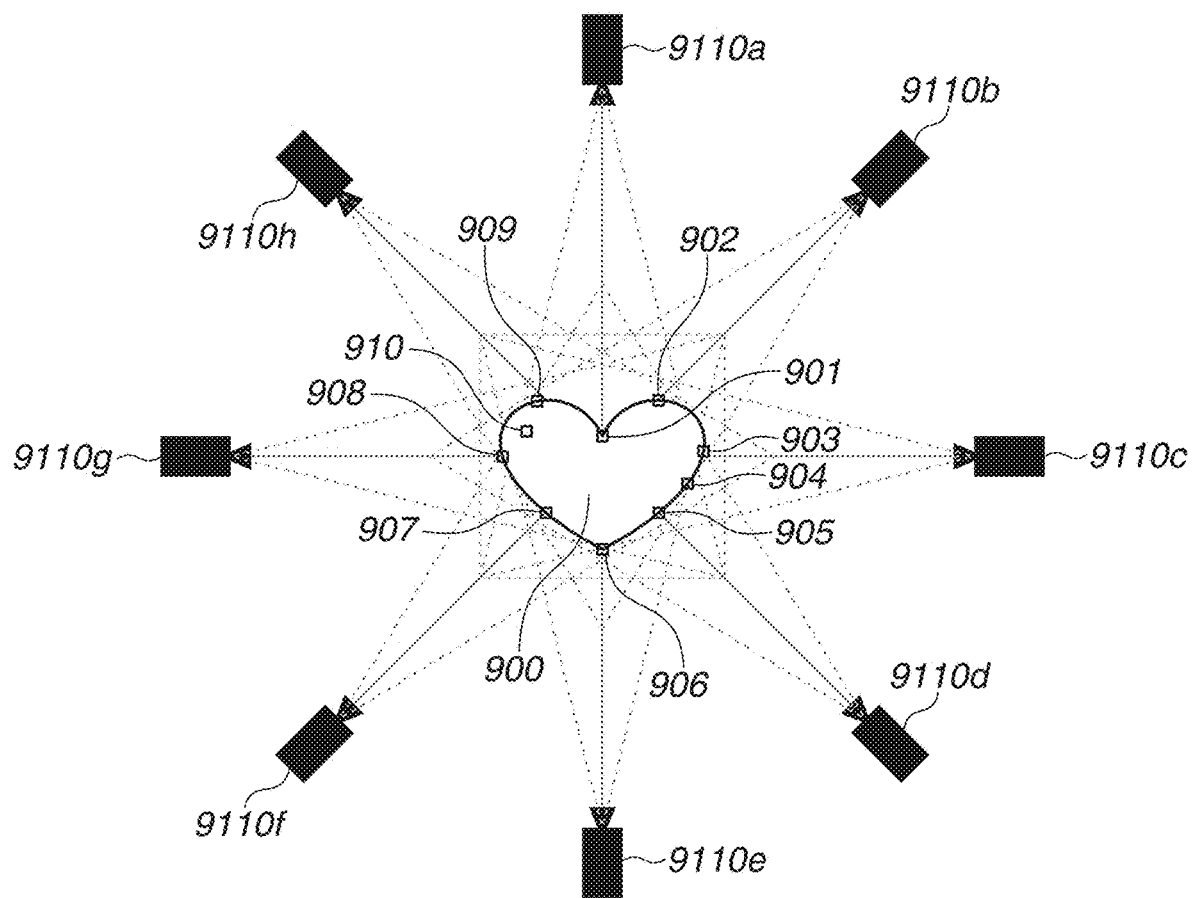
FIG. 9 is a diagram illustrating a state where a plurality of cameras are arranged to surround an object.

The camera system 110 is configured of a plurality of cameras arranged to surround an object. FIG. 9 is a diagram illustrating a state where cameras 9110a to 9110h are arranged to surround an object 900. Hereinafter, each of the cameras 9110a to 9110h is simply referred to as "camera 9110" unless these cameras 9110a to 9110h have to be distinguished from each other. However, the number of the cameras 9110 and arrangement thereof are not limited to the above. The cameras 9110a to 9110h are connected to the switching hub 120 via a network. The time server 130 transmits a synchronization signal to the respective cameras 9110a to 9110h via the switching hub 120 and the network, and the cameras 9110a to 9110h captures images of the object in synchronization with each other.

Next, a configuration of the image processing apparatus 1000 will be described in detail. The image processing apparatus 1000 receives camera information or images captured by a camera to generate information relating to a three-dimensional model. The three-dimensional model generation unit 150 receives images captured by the cameras 9110a to 9110h, and generates a foreground image and data (three-dimensional shape data) such as point cloud data which expresses a three-dimensional model that represents a shape of the object. The visibility data generation unit 160 generates visibility data. Herein, visibility data is information based on a relationship between the three-dimensional model and the positions of the plurality of cameras 9110. The visibility data indicates whether a point that constitutes the point cloud can be observed by the cameras 9110 when imaging is executed. For example, one point is represented by 1 if the one point is captured by the camera 9110, and the one point is represented by 0 if the one point is not captured.

The three-dimensional model correction unit 170 corrects the point cloud data by using the visibility data. The storage unit 180 stores the foreground image, the three-dimensional model, and the visibility data. The storage unit 180 can be configured of a hard disk or a memory, and may be simply a buffer. Further, time information of an image necessary for generating a virtual viewpoint image is input to the storage unit 180, and data of corresponding time is output to the user terminal 200, based on the foreground image, the data expressing the three-dimensional model, and the visible data stored in the storage unit 180.

The camera information acquisition unit 140 acquires an external parameter an internal parameter as camera information at each of the cameras 9110. Information about a position and an orientation of the camera 9110 is acquired as the external parameter, whereas information about a focal distance and an image center of the camera is acquired as the internal parameter. If the camera system 110 is fixed, the camera information acquisition unit 140 may read and acquire the camera information previously input thereto. On the other hand, if the camera 9110 of the camera system 110 can be moved on a camera platform, the camera information acquisition unit 140 acquires the camera information such as an orientation, a direction, and a view angle as appropriate.

Next, the user terminal 200 will be described. With respect to each of the blocks constituting the image processing system 100, the control unit 210 executes management of an operation state and parameter setting control through the network. Further, the control unit 210 outputs time information which represents a frame for generating a virtual viewpoint image to the storage unit 180. When the user operates a virtual camera, the virtual camera operation unit 230 sets a position, a view point, and a direction of the virtual camera. The virtual viewpoint image generation unit 220 receives data necessary for generating a virtual viewpoint image and uses the received data to generate a virtual viewpoint image based on the position, the view angle, and the direction. The generated virtual viewpoint image is displayed on a display (not illustrated), transmitted or stored as image data via the virtual viewpoint image output unit 240.

Figure 11:
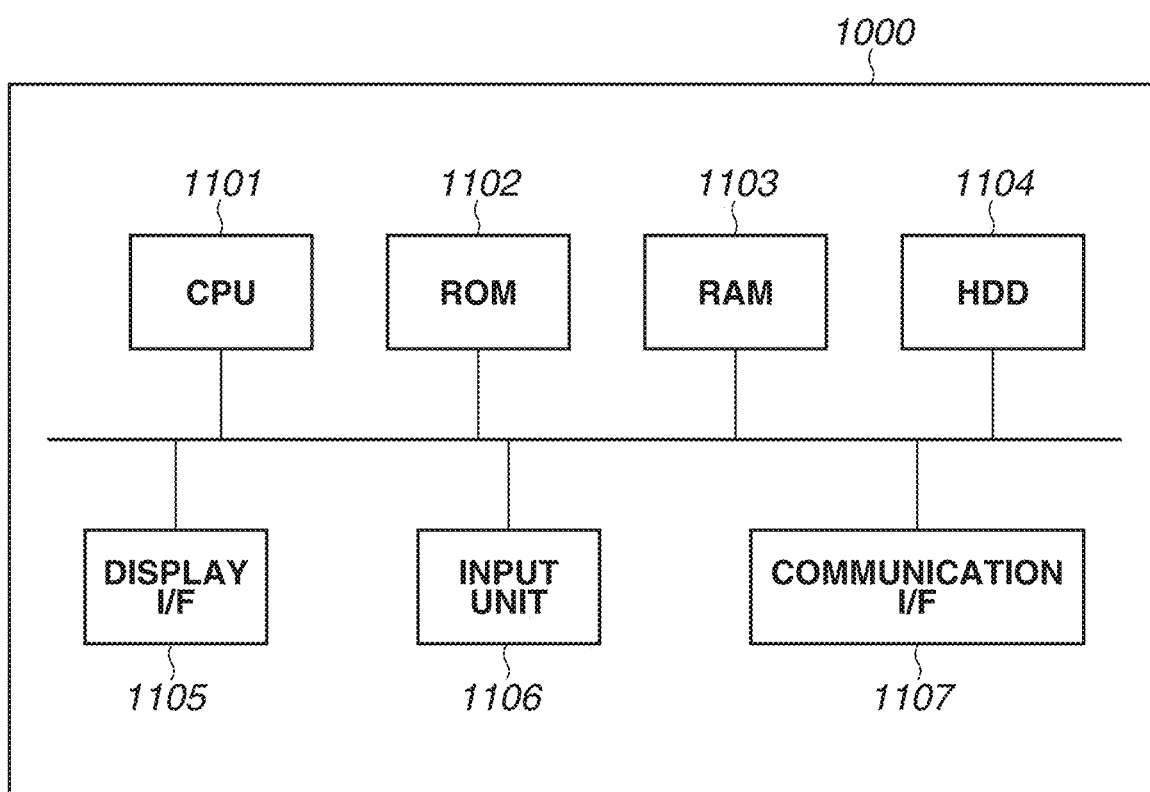
FIG. 11 is a block diagram illustrating an example of a hardware configuration of an image processing apparatus.

FIG. 11 is a block diagram illustrating an example of a hardware configuration of the image processing apparatus 1000 in FIG. 1.

The image processing apparatus 1000 includes a central processing unit (CPU) 1101, a read only memory (ROM) 1102, a random access memory (RAM) 1103, a hard disk drive (HDD) 1104, a display interface (I/F) 1105, an input unit 1106, and a communication I/F 1107. The CPU 1101 reads a control program stored in the ROM 1102 to execute various types of processing. The RAM 1103 is used as a temporary storage area such as a main memory or a work area of the CPU 1101. The HDD 1104 stores various types of data or various programs, and also functions as the storage unit 180 illustrated in FIG. 1. The display I/F 1105 outputs various types of information to a display apparatus (not illustrated). The input unit 1106 includes a keyboard and a mouse, and accepts various operations executed by the user.

The communication I/F 1107 executes processing for communicating with an external apparatus via the network, and acquires images or camera information from the camera system 110. Further, as another example, the communication unit I/F 1107 may wirelessly communicate with an external apparatus.

The CPU 1101 reads a program stored in the ROM 1102 or the HDD 1104, and executes the program to realize the below-described functions or processing of the image processing apparatus 1000. Further, as another example, the CPU 1101 may read a program stored in a storage medium such as a secure digital (SD) card instead of the ROM 1102.

Further, while in the image processing apparatus 1000 according to the present exemplary embodiment, one processor (i.e., CPU 1101) uses one memory (i.e., ROM 1102)

to execute various processing illustrated in the below-described flowcharts, the present disclosure is not limited thereto. For example, a plurality of processors, RAMs, ROMs, and storages may operate cooperatively to execute respective pieces of processing illustrated in the below-described flowchart. Further, a part of the processing may be executed by using a hardware circuit.

A configuration and an operation of the three-dimensional model generation unit 150 will be described. The three-dimensional model generation unit 150 of the present exemplary embodiment processes the data acquired from the camera system 110. The three-dimensional model generation unit 150 determines and cuts out a target such as an athlete as a foreground area from frame data of an input image, and acquires a foreground image as a result of cutout processing. Then, the three-dimensional model generation unit 150 generates a three-dimensional model from an image captured by the camera system 110. Further, the three-dimensional model generation unit 150 writes the foreground image into the storage unit 180. The three-dimensional model can be generated through various methods. For example, processing for generating a silhouette image of the object and processing for estimating a three-dimensional model can be executed as the generation method.

The silhouette image is a binary image in which an object region and a region other than the object region are expressed in white and black respectively. For example, the silhouette image can be generated through a commonly-used method such as a background differentiating method. In the background differentiating method, a difference is calculated between a captured image including an object, and a background image without an object which is previously captured before starting a game, and a region having a value equal to or greater than a threshold value is determined as a silhouette (foreground region). However, a method for generating a silhouette image is not limited thereto. For example, a method for recognizing a human body can be also employed.

Then, a three-dimensional model of the object is estimated by using silhouette images generated from images captured by all of the cameras 9110a to 9110h and camera information thereof. For example, a visual hull method may be used for estimating the three-dimensional model. As a result of the above-described processing, point cloud data which expresses a three-dimensional model that represents a shape of the object can be acquired. The point cloud data is a group of points having three-dimensional coordinates. For example, the point cloud data may be a list of coordinates of existing points. The point cloud data of the three-dimensional model is input to the visibility data generation unit 160 and the three-dimensional model correction unit 170.

From the point cloud data of the three-dimensional model and the camera information acquired by the camera information acquisition unit 140, the visibility data generation unit 160 estimates a distance between each of the points in the point cloud of the three-dimensional model, and the camera 9110, and generates a distance image. Then, the visibility data generation unit 160 uses the three-dimensional model and the distance image to determine visibility that indicates whether respective points in the three-dimensional model can be observed by the camera system 110.

Figure 3:
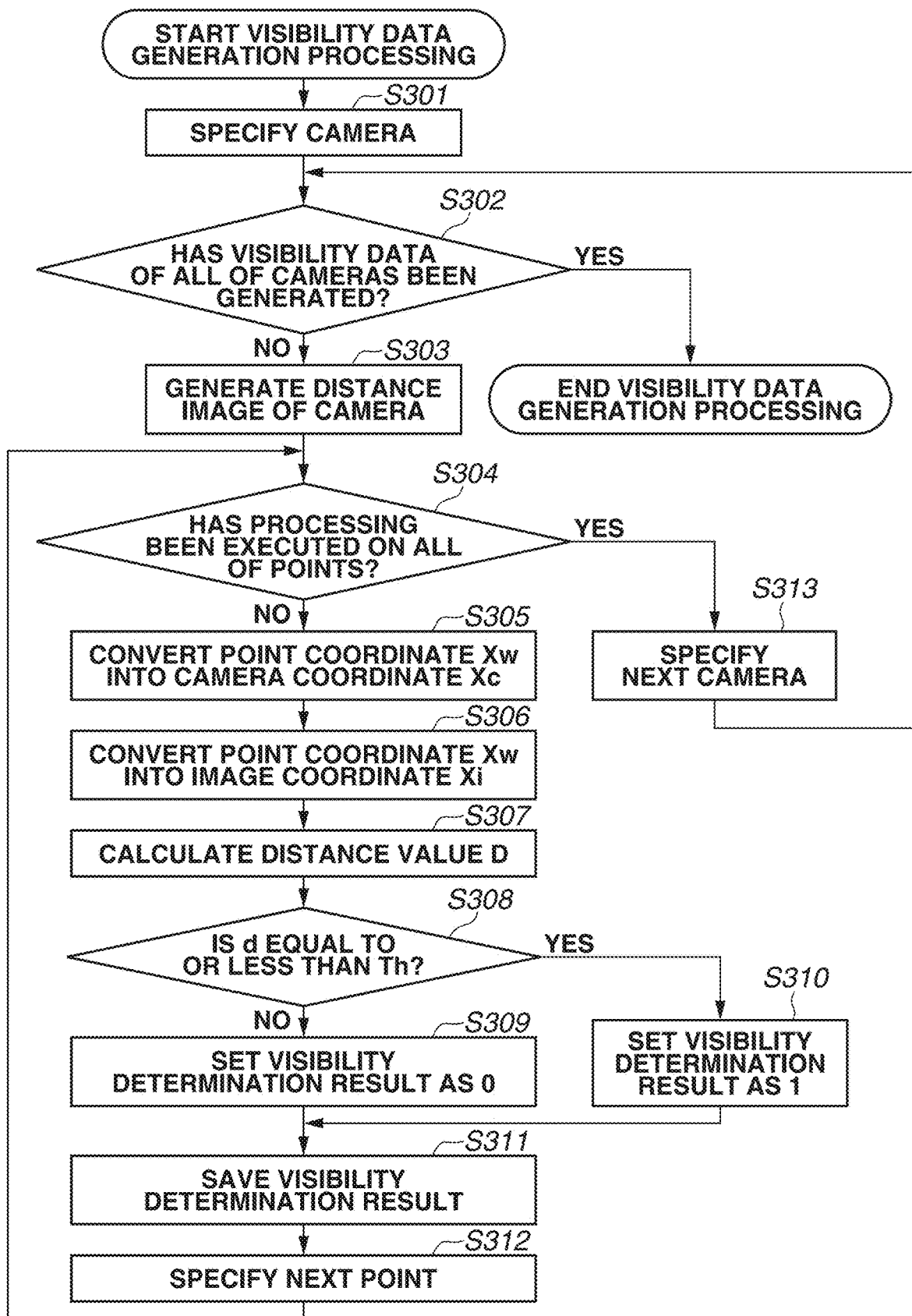
FIG. 3 is a flowchart illustrating an example of a processing procedure for generating visibility data.

FIG. 3 is a flowchart illustrating an example of a processing procedure for generating visibility data executed by the visibility data generation unit 160.

In step S301, the visibility data generation unit 160 selects the camera 9110 on which the processing is to be executed first from the camera system 110.

Then, in step S302, the visibility data generation unit 160 determines whether visibility data of all of the cameras 9110 has been generated with respect to the three-dimensional model. As a result of this determination, if visibility data of all of the cameras 9110 has been generated (YES in step S302), the processing is ended. If visibility data of not all of the cameras 9110 has been generated (NO in step S302), the processing proceeds to step S303.

In step S303, the visibility data generation unit 160 estimates a distance from an actual camera to the object to generate a distance image. A method of estimating the distance is not limited to any particular one. For example, a point of the point cloud of the three-dimensional model is multiplied by a matrix consisting of the external parameters of the camera 9110, and a coordinate of the camera coordinate system is calculated. When a direction in which a lens of the camera 9110 faces is specified as a positive direction of the z-axis of the camera coordinate system by making a position of the camera 9110 as an origin, a value of the coordinate represents a distance value, and a coordinate of the distance image can be acquired by calculating an image coordinate of that coordinate.

In step S304, the visibility data generation unit 160 determines whether the processing has been ended with respect to all of points in the point cloud of the three-dimensional model. As a result of this determination, if the processing has not been ended with respect to all of the points (NO in step S304), the processing proceeds to step S305. If the processing has been ended with respect to all of the points (YES in step S304), the processing proceeds to step S313. In step S313, the visibility data generation unit 160 selects the next camera 9110 from the camera system 110, and the processing proceeds to step S302.

In step S305, the visibility data generation unit 160 converts a point coordinate $X_w$ of the point selected from the point cloud of the three-dimensional model into a camera coordinate $X_c$.

In step S306, the visibility data generation unit 160 converts the point coordinate $X_w$ of the point selected from the point cloud of the three-dimensional model into an image coordinate $X_i$.

In step S307, the visibility data generation unit 160 sets a coordinate of the z-axis of the camera coordinate $X_c$ as a distance value D.

In step S308, the visibility data generation unit 160 compares an absolute value d of a difference between a distance value $D_x$ in the image coordinate $X_i$ of the distance image calculated in step S303 and the distance value D, with a threshold value Th. As a result of this comparison, if the absolute value d of the difference is the threshold value Th or less (YES in step S308), the processing proceeds to step S310. If the absolute value d is greater than the threshold value Th (NO in step S308), the processing proceeds to step S309. Although the absolute value of the difference is used in the present exemplary embodiment, a method is not limited thereto. For example, a fraction of the distance values $D_x$ and D may be calculated and compared with the threshold value Th. In this case, a value close to 1 is determined to be the threshold value Th. Then, the processing proceeds to step S310 if the fraction is the threshold value Th or more, and the processing proceeds to step S309 if the fraction is less than the threshold value Th.

In step S309, the visibility data generation unit 160 determines that the selected point is unobservable, and sets a visibility determination result as 0. Then the processing proceeds to step S311.

In step S310, the visibility data generation unit 160 determines that the selected point is observable by the camera 9110, and sets the visibility determination result as 1. Then the processing proceeds to step S311.

In step S311, the visibility data generation unit 160 saves a visibility determination result as the visibility data of that point.

In step S312, the visibility data generation unit 160 selects a next point of the point cloud of the three-dimensional model, and the processing proceeds to step S304.

FIG. 10 illustrates an example of the visibility data. In the example illustrated in FIG. 10, points 901 to 910 are given as examples of the representative points of the object 900 in FIG. 9. As illustrated in FIG. 10, the visibility data is applied to all of points in the point cloud. In FIG. 10, a column represents the camera 9110, while a row represents a point. A value 1 indicates that the point can be observed by the camera 9110. A value 0 indicating that the point cannot be observed is not described, and a corresponding box is left in blank.

The visibility data generated as shown in the above is written into the storage unit 180 and simultaneously input to the three-dimensional model correction unit 170 by the visibility data generation unit 160.

Figure 2:
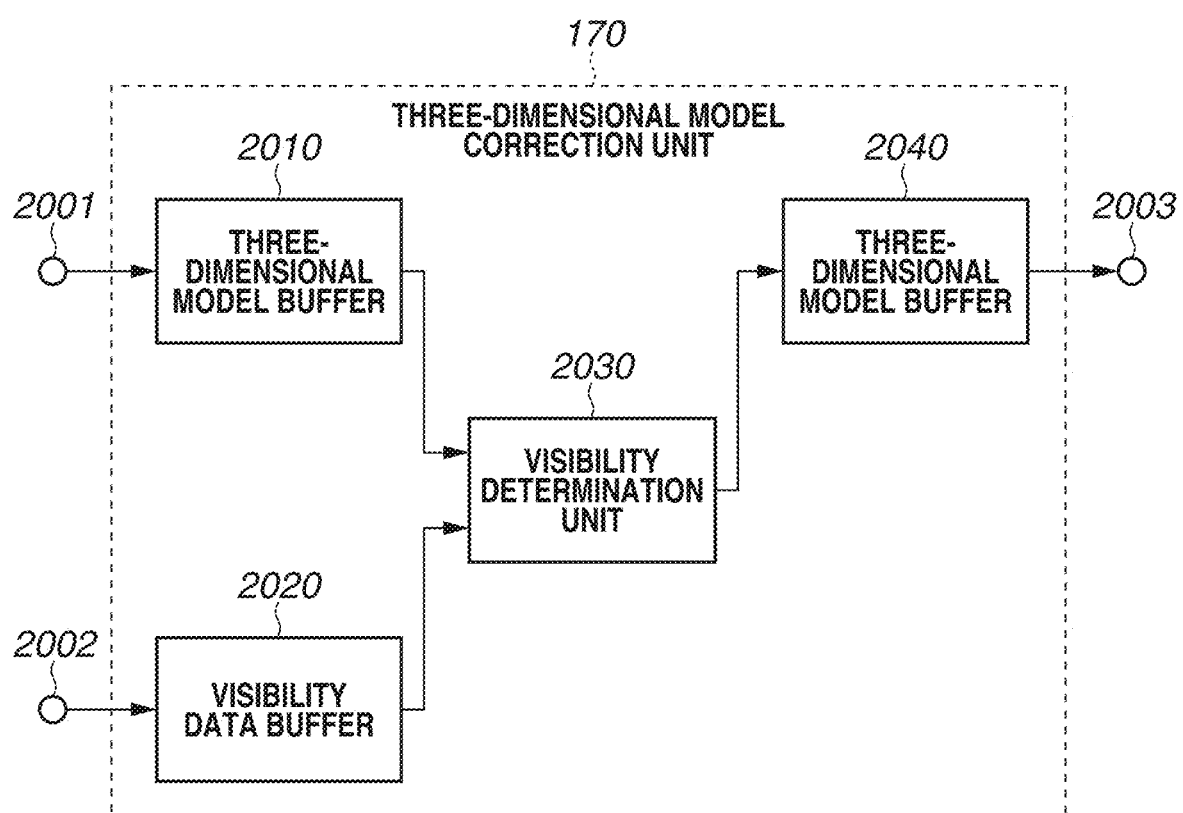
FIG. 2 is a block diagram illustrating an example of a detailed configuration of a three-dimensional model correction unit.

The three-dimensional model correction unit 170 uses the visibility data generated by the visibility data generation unit 160 to correct the three-dimensional model. FIG. 2 is a block diagram illustrating an example of a detailed configuration of the three-dimensional model correction unit 170.

The three-dimensional model correction unit 170 is connected to the three-dimensional model generation unit 150, and receives point cloud data 2001 of the three-dimensional model. Further, the three-dimensional model correction unit 170 is also connected to the visibility data generation unit 160, and receives visibility data 2002 of the three-dimensional model.

A three-dimensional model buffer 2010 retains the received point cloud data 2001 only for a period in which the correction is executed. A visibility data buffer 2020 retains the received visibility data 2002 only for a period in which the correction is executed. With respect to each point in the point cloud, the visibility determination unit 2030 determines whether the point should be saved by using the visibility data. A three-dimensional model buffer 2040 temporarily saves a point which the visibility determination unit 2030 determines to save as a point of the point cloud of the three-dimensional model. Then, the three-dimensional model correction unit 170 outputs point cloud data 2003 of the three-dimensional model to the storage unit 180.

First, point cloud data of the three-dimensional model before executing correction processing is input to and stored in the three-dimensional model buffer 2010. Simultaneously, visibility data at the same time that the three-dimensional model which is a processing target is input to and stored in the visibility data buffer 2020. The visibility determination unit 2030 reads the three-dimensional data to be corrected from the three-dimensional model buffer 2010, and reads the visibility data corresponding to the received three-dimensional data from the visibility data buffer 2020. The RAM 1103 or the HDD 1104 may be used as the hardware of the three-dimensional model buffer 2010, the visibility data buffer 2020, or the three-dimensional model buffer 2040.

Figure 4:
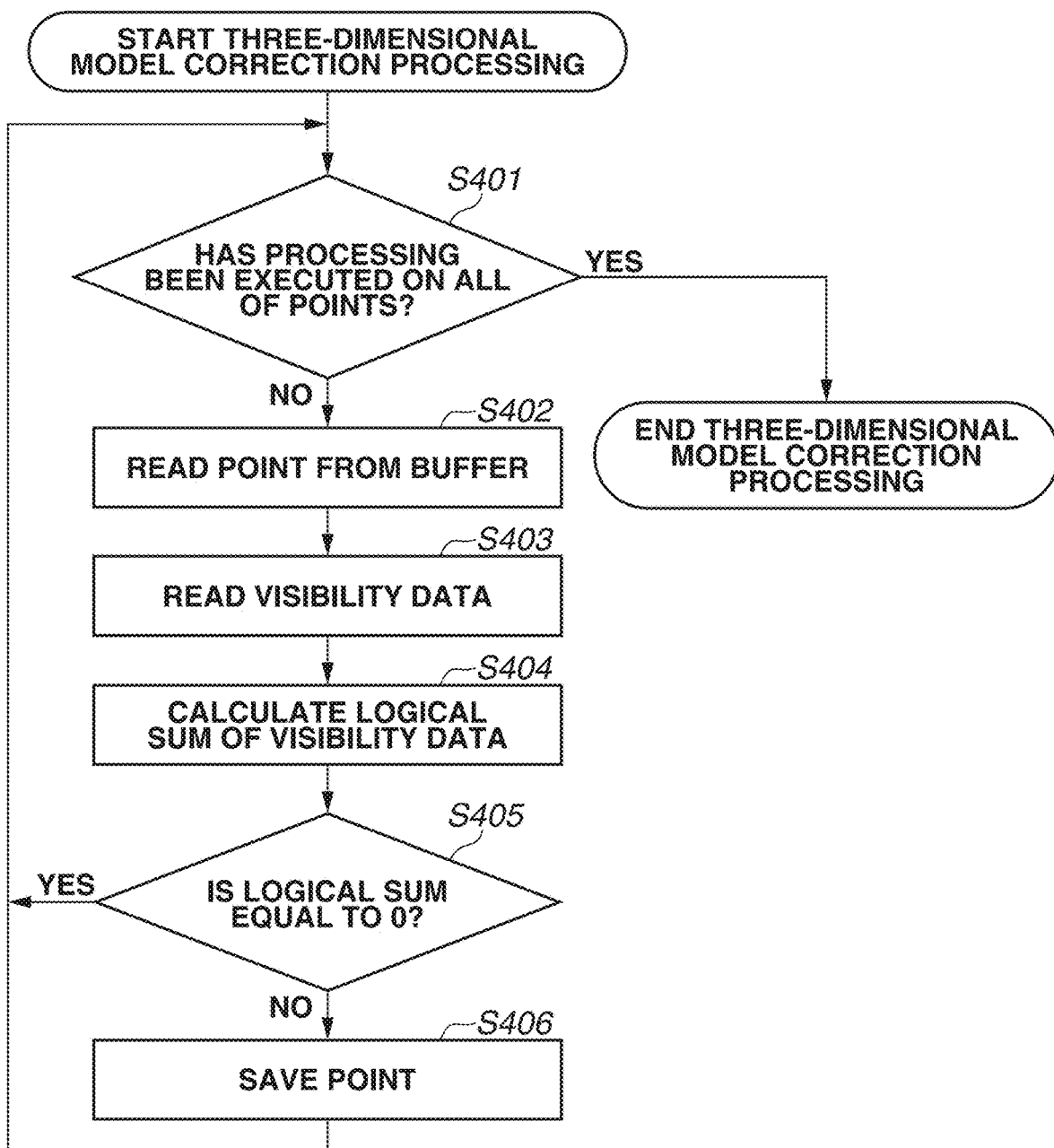
FIG. 4 is a flowchart illustrating an example of a processing procedure for correcting point cloud data.

FIG. 4 is a flowchart illustrating an example of a processing procedure for correcting the point cloud data of the three-dimensional model executed by the three-dimensional model correction unit 170.

First, in step S401, the three-dimensional model correction unit 170 determines whether determination has been ended with respect to all of the points in the point cloud of the three-dimensional model. As a result of this determination, if determination has been ended with respect to all of the points (YES in step S401), the processing is ended. If determination has not been ended (NO in step S401), the processing proceeds to step S402.

In step S402, the visibility determination unit 2030 selects and reads a point as a correction determination target from the three-dimensional model buffer 2010.

In step S403, the visibility determination unit 2030 reads visibility data corresponding to the point which is a correction determination target, from the visibility data buffer 2020.

In step S404, the visibility determination unit 2030 uses the visibility data to calculate a logical sum of the point selected in step S402. In the example illustrated in FIG. 10, a logical sum of values of the respective cameras 9110 is calculated with respect to all of the points. The logical sum is 1 if a visibility determination result of at least one camera 9110 is 1. In the example illustrated in FIG. 10, the logical sum is calculated as 1 at each of the points 901 to 909, whereas the logical sum is calculated as 0 at the point 910. This indicates that the points 901 to 909 can be observed by any of the cameras 9110, and that the point 910 can be observed by none of the cameras 9110.

In step S405, the visibility determination unit 2030 determines whether the logical sum of the point selected from the points 901 to 910 is 0 or 1. As a result of this determination, if the logical sum is 1 (NO in step S405), the point is a target to be saved, and the processing proceeds to step S406. On the other hand, if the logical sum is 0 (YES in step S405), the point is not a target to be saved, so that the processing returns to step S401, and the processing of the next point is executed.

In step S406, the visibility determination unit 2030 saves the point having 1 as the logical sum in the three-dimensional model buffer 2040. Then, the processing returns to step S401. The above processing is executed with respect to all of the three-dimensional models and the points constituting the three-dimensional models. As a result, point cloud data of the three-dimensional model consisting of only the points observable by any of the cameras 9110 can be generated.

Thereafter, the user terminal 200 can generate a virtual viewpoint image by using the corrected point cloud data.

Information such as a position, an orientation, and a view angle of the virtual camera of the virtual viewpoint image which is to be created is input to the user terminal 200 via a virtual camera operation unit 230 through the operation executed by the user. In the virtual camera operation unit 230, a virtual viewpoint is input through a device such as a joystick. Further, information such as starting time of a video picture is also input.

The control unit 210 acquires data such as a foreground image, a three-dimensional model, and visibility data necessary for generating the virtual viewpoint image from the storage unit 180 and inputs the acquired data to the virtual viewpoint image generation unit 220. The virtual viewpoint image generation unit 220 uses the foreground image, the three-dimensional model, and the visibility data to execute coloring processing according to the virtual viewpoint specified by the virtual camera operation unit 230 and generates the virtual viewpoint image. The virtual viewpoint image generated by the virtual viewpoint image generation unit 220 is output from the virtual viewpoint image output unit 240, and the output image is displayed or recorded.

As described above, according to the present exemplary embodiment, only points that can be observed by the camera 9110 are retained from among the point cloud data constituting the three-dimensional model. With this configuration, only the points necessary for generating the virtual viewpoint image can be retained, and a memory size of the storage unit 180 or bandwidths of respective transmission paths can be reduced, so that it is possible to reduce a size of the apparatus or to use a low-cost transmission path.

Further, the image processing system 100 according to the present exemplary embodiment is not limited to the above-described physical configuration, and may be configured logically. The image processing system 100 may also be configured of hardware or a computer including operable software. Further, in the present exemplary embodiment, although the point of the three-dimensional model is determined by using the logical sum, the present disclosure is not limited thereto. For example, a sum of each point may be acquired, and the determination may be made based on whether the sum is equal to or greater than 0. Furthermore, while visibility data of all of the cameras 9110 has been used, the present disclosure is not limited thereto.

Further, while the network and the switching hub 120 are used to connect the camera system 110 and the image processing apparatus 1000, the present disclosure is not limited thereto, and transmission can be executed by connecting the camera system 110 and the image processing apparatus 1000 using a serial digital interface (SDI).

Figure 5:
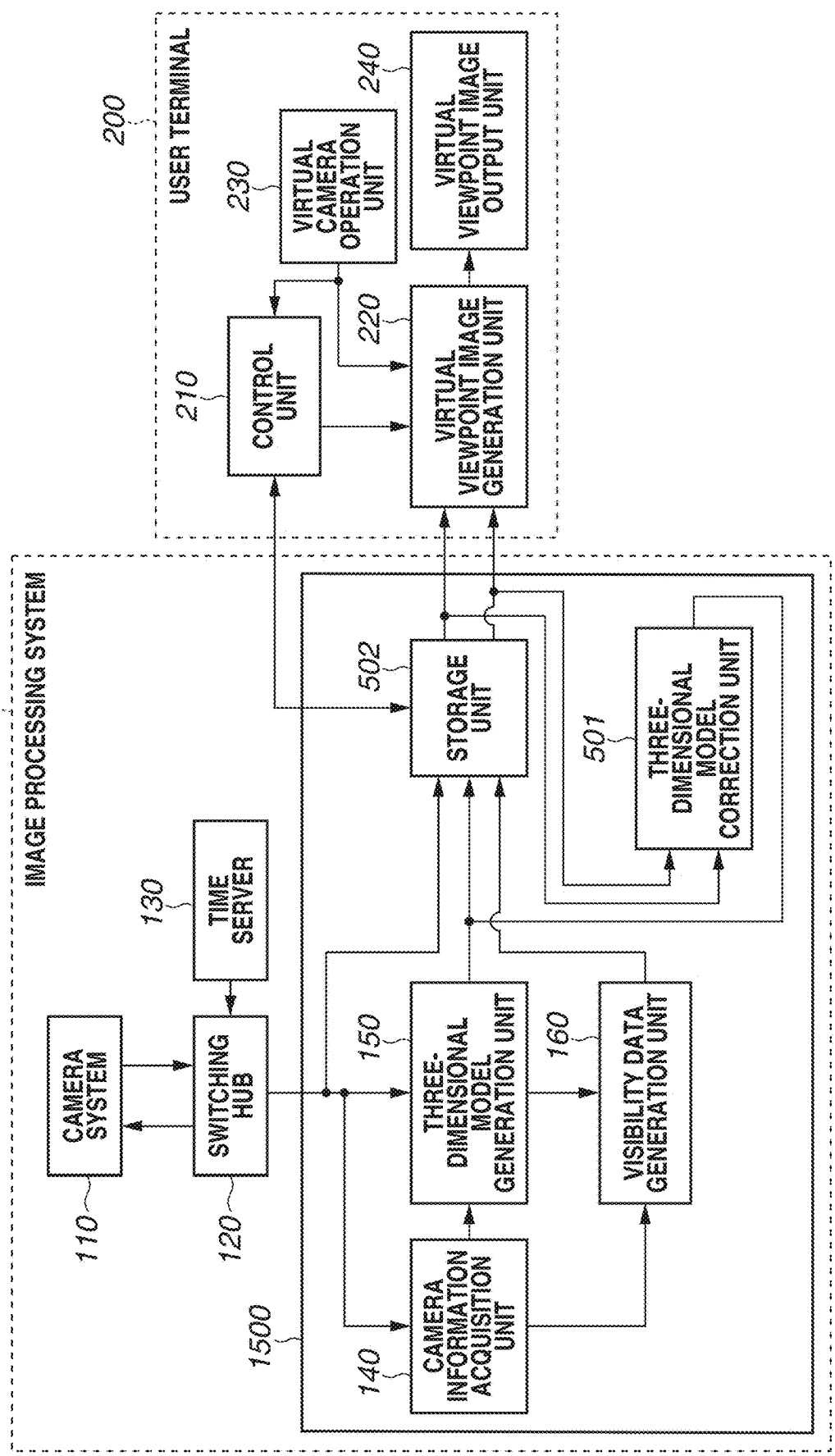
FIG. 5 is a block diagram illustrating another example of the functional configuration of the image processing system according to one or more aspects of the present disclosure.

Further, in the present exemplary embodiment, an image processing system 500 configured as illustrated in FIG. 5 may be also employed. In FIG. 5, same reference numerals are applied to the constituent elements having the functions similar to those illustrated in FIG. 1, and description thereof will be omitted. Similar to the storage unit 180 in FIG. 1, a storage unit 502 stores a foreground image, a three-dimensional model, and visibility data. A three-dimensional model correction unit 501 reads point cloud data relating to the three-dimensional model stored in the storage unit 502 and visibility data corresponding to that three-dimensional model. Similar to the three-dimensional model correction unit 170 in FIG. 1, the three-dimensional model correction unit 501 also makes a determination about visibility and corrects the three-dimensional model. The three-dimensional model correction unit 501 stores the corrected three-dimensional model in the storage unit 502 and discards the read three-dimensional model before making a correction.

Further, in a case where a virtual viewpoint image is generated on a real-time basis, the image processing apparatus 1000 may not have the storage unit 180 in FIG. 1, but may directly transmit the foreground image, the three-dimensional model, and the visibility data to the user terminal 200. Similar to the configuration illustrated in FIG. 5, the image processing apparatus 1500 may directly transmit the foreground image, the three-dimensional model, and the visibility data to the user terminal 200.

Further, in the present exemplary embodiment, while the visibility data generation unit 160 and the three-dimensional model correction unit 170 are configured separately, the configuration is not limited thereto. Because the point cloud data of the three-dimensional model is input to the visibility data generation unit 160, the visibility data generation unit 160 may correct and output the point cloud data of the three-dimensional model after generating the visibility data.

Hereinafter, an image processing system according to the second exemplary embodiment of the present disclosure will be described.

Figure 6:
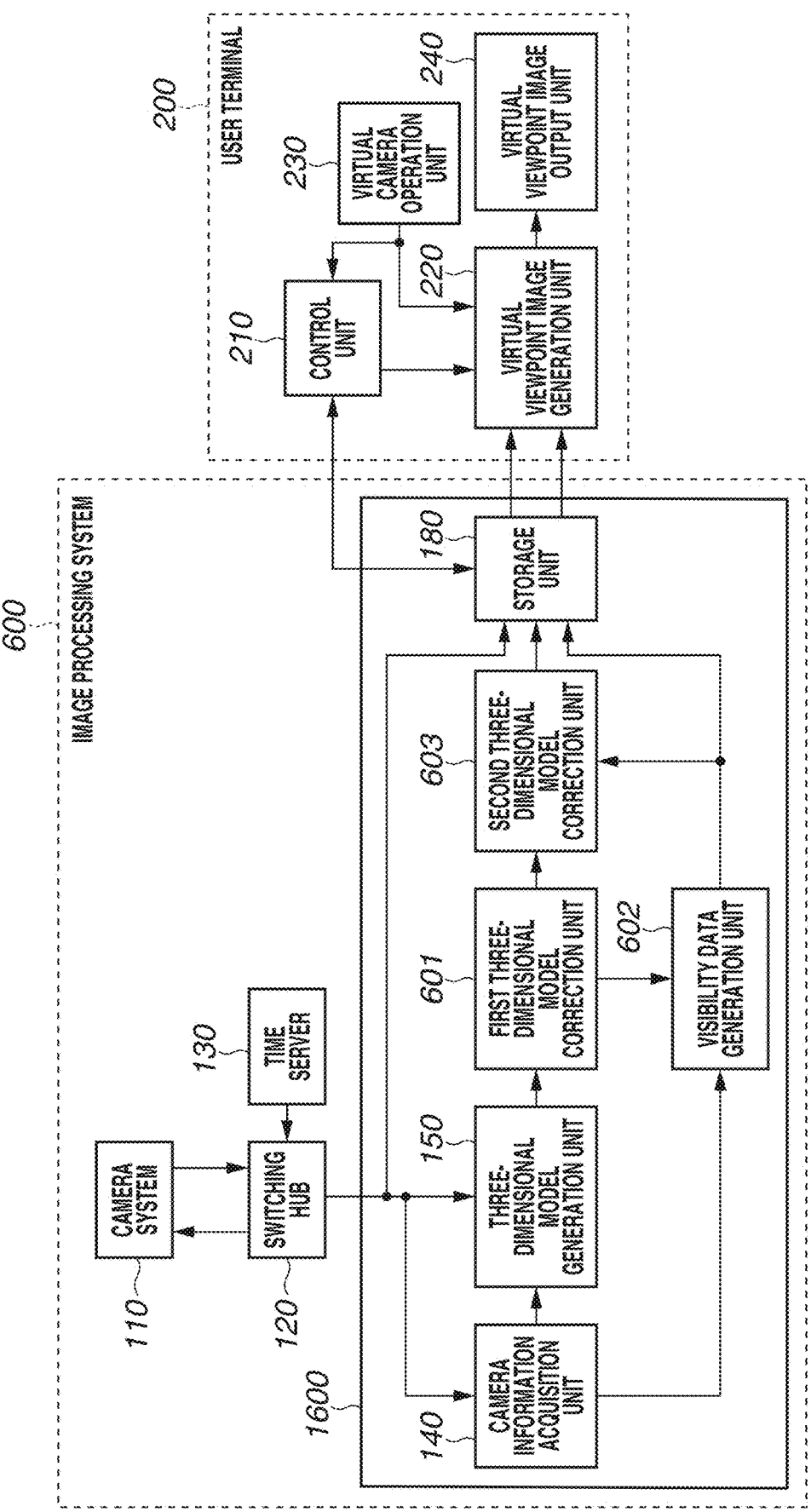
FIG. 6 is a block diagram illustrating an example of a functional configuration of an image processing system according to one or e aspects of the present disclosure.

FIG. 6 is a block diagram illustrating an example of a functional configuration of the image processing system according to the present exemplary embodiment. In FIG. 6, same reference numerals are applied to blocks having functions similar to those illustrated in FIG. 1 described in the first exemplary embodiment, and description thereof will be omitted. Further, a hardware configuration of an image processing apparatus 1600 is similar to the hardware configuration in FIG. 11, so that description thereof will be omitted.

A first three-dimensional model correction unit 601 executes the first-stage correction on the point cloud data of the three-dimensional model generated by the three-dimensional model generation unit 150. A visibility data generation unit 602 receives the point cloud data of the three-dimensional model corrected by the first three-dimensional model correction unit 601 to generate visibility data. The visibility data generation unit 602 is different from the visibility data generation unit 160 in FIG. 1 only in the received point cloud data of the three-dimensional model, and all the rest is similar to that of the visibility data generation unit 160 in FIG. 1. A second three-dimensional model correction unit 603 uses the visibility data to execute the second-stage correction on the point cloud data of the three-dimensional model corrected by the first three-dimensional model correction unit 601 to delete a point that is not necessary for generating a virtual viewpoint image. The second three-dimensional model correction unit 603 is different from the three-dimensional model correction unit 170 in FIG. 1 only in the received point cloud data of the three-dimensional model, and all the rest is similar to that of the three-dimensional model correction unit 170 in FIG. 1.

First, point cloud data of the three-dimensional model before executing the correction processing is input to the first three-dimensional model correction unit 601 from the three-dimensional model generation unit 150. The first three-dimensional model correction unit 601 converts a coordinate of a position where a point of the received point cloud data exists into a three-dimensional flag array by using a three-dimensional matrix of the point which represents a space. More specifically, at each of coordinate positions representing a position of a vertex of a cube illustrated in FIG. 8, "1" is applied to a coordinate position if a point of the point cloud data exists, and "0" is applied to the coordinate position if the point does not exist. Then, respective values are stored in the HDD 1104. Thereafter, correction of the point cloud data is executed through the procedure described below. In addition, the above-described values are stored in the HDD 1104 until the below-described processing in FIG. 7 is ended.

Figure 7:
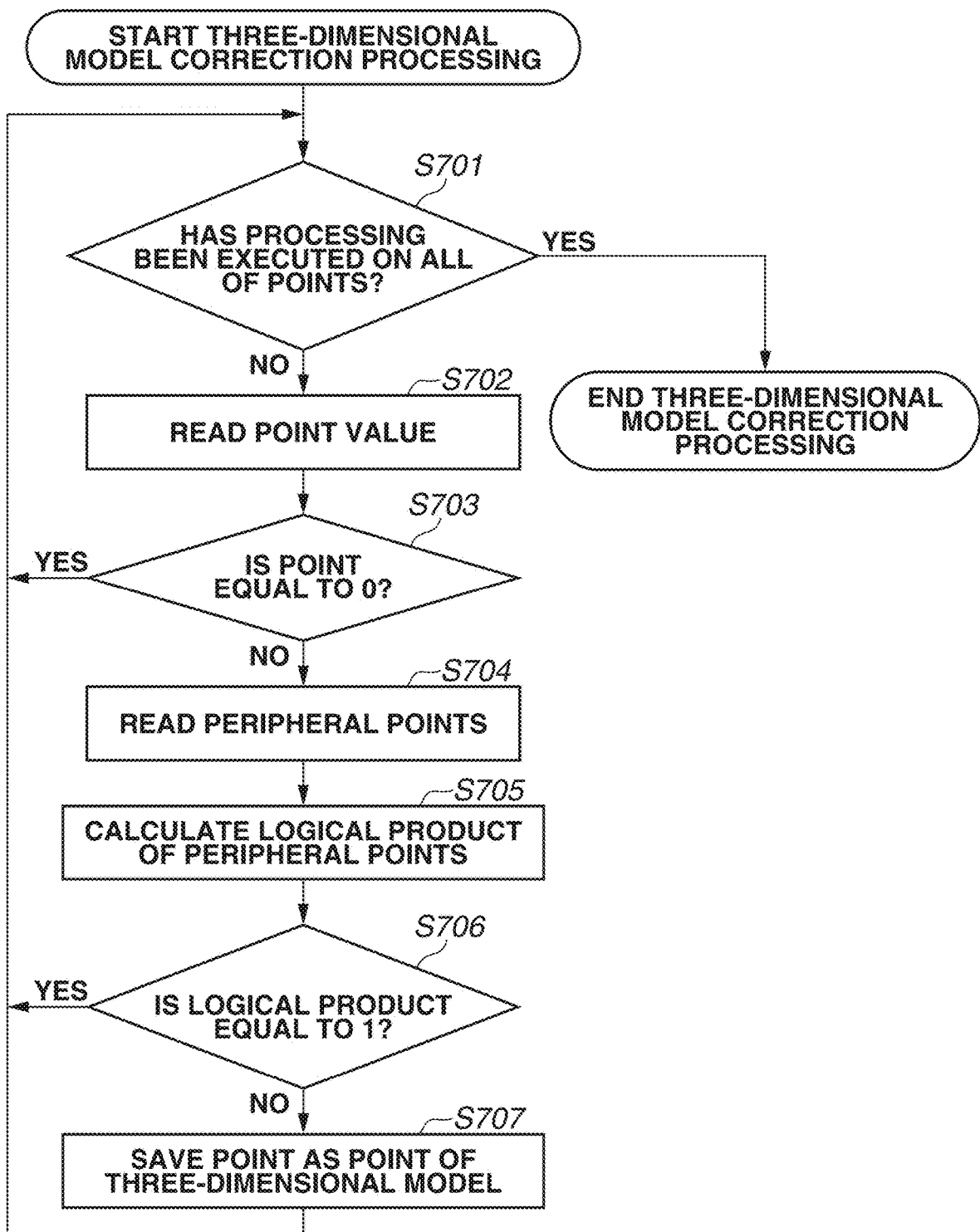
FIG. 7 is a flowchart illustrating an example of a processing procedure for correcting point cloud data.

FIG. 7 is a flowchart illustrating an example of a procedure of correction processing executed by the first three-dimensional model correction unit 601.

In step S701, the first three-dimensional model correction unit 601 determines whether values are determined to be either 1 or 0 at all of the coordinate positions of the three-dimensional model. As a result, if the above determination has been ended at all of the coordinate positions (YES in step S701), the processing is ended. If the determination has not been ended (NO in step S701), the processing proceeds to step S702.

In step S702, the first three-dimensional model correction unit 601 selects the coordinate position (point) as a correction determination target, and reads a value of a point from the HDD 1104 at the coordinate position.

In step S703, the first three-dimensional model correction unit 601 determines whether the value of the point read in step S702 is 0. As a result of the determination, if the value is 0 (YES in step S703), the processing is executed at the next coordinate position, so that the processing returns to step S701. On the other hand, if the value is 1 (NO in step S703), a point of the point cloud data exists in that coordinate position, so that the processing proceeds to next step S704.

Figure 8:
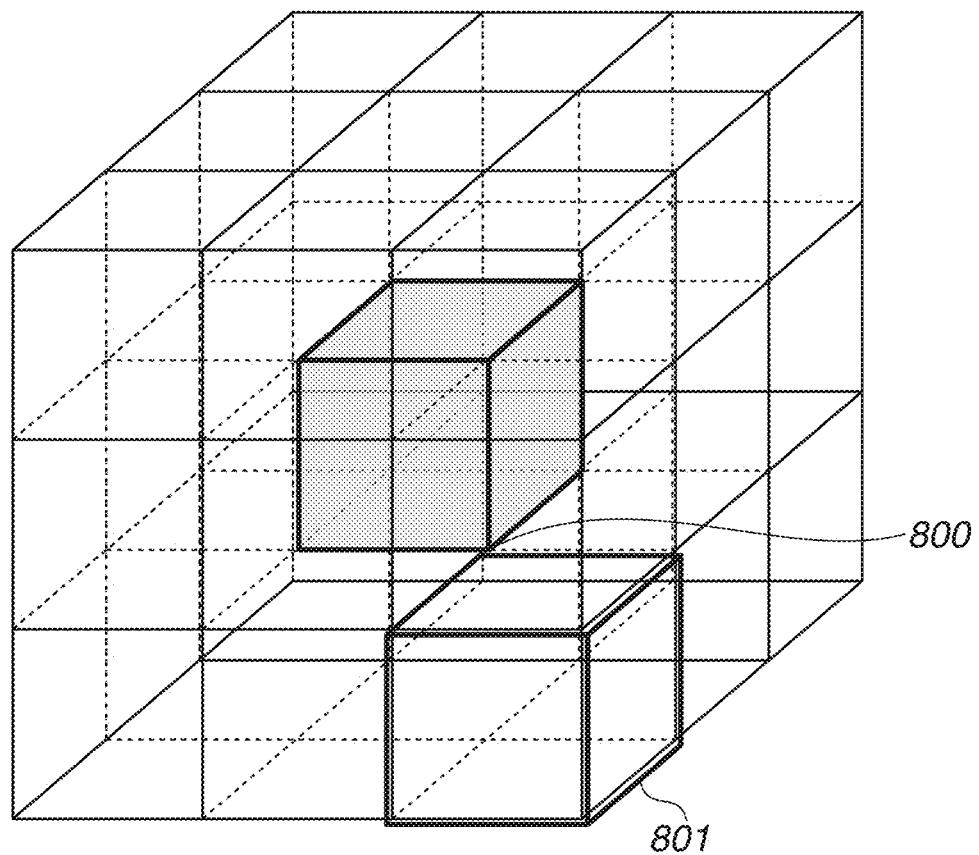
FIG. 8 is a diagram illustrating a point in a periphery of the point as a correction determination target.

In step S704, the first three-dimensional model correction unit 601 reads values of points in a periphery of the point as a correction determination target from the HDD 1104. As illustrated in FIG. 8, if a point 800 is specified as a correction determination target, 26 points which are three-dimensionally adjacent to the point 800 are specified as the peripheral points. In other words, as there are eight cubes 801 which include the point 800, the vertexes of the eight cubes 801 excluding the point 800 are specified as the peripheral points.

In step S705, the first three-dimensional model correction unit 601 calculates a logical product of the values of the peripheral points. The logical product is 1 if the values are 1 at all of the adjacent 26 points, otherwise, the logical product is 0.

In step S706, the first three-dimensional model correction unit 601 determines whether the logical product calculated in step S705 is 1. As a result of this determination, if the logical product is 0 (NO in step S706), the processing proceeds to step S707, and if the logical product is 1 (YES in step S706), the processing returns to step S701 to execute the processing with respect to the next coordinate position.

In step S707, the first three-dimensional model correction unit 601 stores the point of that coordinate position as a point of the point cloud data of the three-dimensional model in the HDD 1104. Thereafter, the processing returns to step S701 to execute the processing on the next coordinate position.

A reason for making the processing return to step S701 when the logical product of values of the peripheral points are 1 and making the processing proceed to step S707 when the logical product of the peripheral points is 0 will be described. When a point as a correction determination target is expressed as P(0, 0, 0), a value of the corrected point P'(0, 0, 0) can be calculated by the following formula.

if $((P(-1,-1,-1)=1)\&(P(0,-1,-1)=1)\&$ $(P(1,-1,-1)=1)\&(P(-1,0,-1)=1)\&$ $(P(0,0,-1)=1)\&(P(1,0,-1)=1)\&$ $(P(-1,1,-1)=1)\&(P(0,1,-1)=1)\&$ $(P(1,1,-1)=1)\&(P(-1,-1,0)=1)\&$ $(P(0,-1,0)=1)\&(P(1,-1,0)=1)\&$ $(P(-1,0,0)=1)\&(P(1,0,0)=1)\&$ $(P(-1,1,0)=1)\&(P(0,1,0)=1)\&$ $(P(1,1,0)=1)\&(P(-1,-1,1)=1)\&$ $(P(0,-1,1)=1)\&(P(1,-1,1)=1)\&$ $(P(-1,0,1)=1)\&(P(0,0,1)=1)\&$ $(P(1,0,1)=1)\&(P(-1,1,1)=1)\&$ $(P(0,1,1)=1)\&(P(1,1,1)=1))$ then

P'(0,0,0)=0 else

P'(0,0,0)=1      (1)

In the formula 1, if values are 1 in all of the peripheral points (i.e., if the logical product is 1), the point can be regarded as a point that cannot be seen from the outside. In this case, because the point does not have to be retained as a point of the point cloud data, 0 is set as the value so that the point does not exist as the point of the point cloud data after making correction. On the other hand, if a value is 0 in at least one of the peripheral points (i.e., points of the point cloud data are not sufficient in its periphery), the point may be seen from the outside when the point is observed from that direction. Accordingly, the point has to be retained as a point of the point cloud data. As described above, in the present exemplary embodiment, whether to retain the point as a point of the point cloud data is determined based on a peripheral state of that point.

When the above-described processing in FIG. 7 is ended, all of the points saved in step S707 are specified as the point cloud data of the corrected three-dimensional model. Then, the first three-dimensional model correction unit 601 outputs the point cloud data of the corrected three-dimensional model to the visibility data generation unit 602 and the second three-dimensional model correction unit 603. The above-described processing is executed with respect to all of the three-dimensional models and the points constituting the three-dimensional models.

Thereafter, similar to the visibility data generation unit 160 of the first exemplary embodiment, the visibility data generation unit 602 generates the visibility data. Differently from the first exemplary embodiment, a target point of the processing in step S305 and subsequent steps in FIG. 3 is a point of the point cloud data of the three-dimensional model corrected by the first three-dimensional model correction unit 601.

Similar to the three-dimensional model correction unit 170 of the first exemplary embodiment, the second three-dimensional model correction unit 603 generates point cloud data of the three-dimensional model consisting of only the points which can be seen from any of the cameras 9110. Then, the corrected three-dimensional model is stored in the storage unit 180.

As described above, according to the present exemplary embodiment, only a point that is observable from a camera is retained in the point cloud data of the three-dimensional model, so that only a point necessary for generating a virtual viewpoint image can be retained. Thus, a memory size of the storage unit 180 or bandwidths of respective transmission paths can be reduced. Particularly, because a part of the target points of the point cloud data is deleted in generating visibility data, a load of generation processing of the visibility data can be reduced, so that the processing can be executed at higher speed.

Further, a configuration of the image processing system 600 in the present exemplary embodiment is not limited to the physical configuration as described above, and may be configured logically. The image processing system 600 may be configured of hardware or a computer including operable software. Further, correction processing executed by the first three-dimensional model correction unit 601 is not limited to the above, and the method described in the Japanese Patent No. 5068732 can be also employed.

Other Exemplary Embodiments

In the above-described exemplary embodiments, although the storage units 180 and 502 have been described as the constituent elements included in the image processing apparatus, the storage units 180 and 502 may be the constituent elements included in the user terminal 200 or other apparatuses.

According to the above-described exemplary embodiments, a virtual viewpoint image can be simply generated regardless of a scale of an apparatus constituting the system, the number of cameras 9110 included in the camera system 110, or an output resolution and an output frame rate of the captured image. While the exemplary embodiment of the present disclosure has been described in detail, the present disclosure is not limited to the above-described specific exemplary embodiments, and many variations and modifications are possible within the essential spirit of the present disclosure described in the scope of appended claims.

The present disclosure may be realized in such a manner that a program for realizing one or more functions according to the above-described exemplary embodiments is supplied to a system or an apparatus via a network or a storage medium, and one or more processors in the system or the apparatus reads and executes the program. Further, the present disclosure can be also realized with a circuit (e.g., application specific integrated circuit (ASIC)) that realizes one or more functions.

According to the present disclosure, it is possible to reduce a data amount of the three-dimensional model relating to generation of the virtual viewpoint image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-008047, filed Jan. 22, 2018, which is hereby incorporated by reference herein in its entirety.

What is claimed is:

1. An image processing apparatus comprising:
   one or more memories storing instructions; and
   one or more processors executing the instructions to:
   obtain three-dimensional shape data which represents a three-dimensional shape of an object based on images captured in a plurality of directions and includes a plurality of elements, and
   generate three-dimensional shape data which represents a three-dimensional shape of the object and does not include a target element, in a case where an absolute value of a difference between a distance specified by a position which corresponds to the target element included in the obtained three-dimensional shape data and which is included in a distance image and a distance between an image capturing apparatus and the target element included in the obtained three-dimensional shape data of the object is larger than a threshold, the distance specified by the position included in the distance image representing a distance between the image capturing apparatus and an element positioned at a surface of the obtained three-dimensional shape data of the object.

2. The image processing apparatus according to claim 1, wherein the obtained three-dimensional shape data representing the three-dimensional shape of the object is generated based on the images captured in the plurality of directions using a method based on a volume intersection method.

3. The image processing apparatus according to claim 1, wherein the obtained three-dimensional shape data representing the three-dimensional shape of the object is generated based on images representing a region of the object extracted from the images captured in the plurality of directions.

4. The image processing apparatus according to claim 1, wherein the obtained three-dimensional shape data is data expressed by point cloud.

5. The image processing apparatus according to claim 1, wherein the generated three-dimensional shape data is used for generating a virtual viewpoint image.

6. The image processing apparatus according to claim 1, wherein the distance image is generated based on a position of the image capturing apparatus, an orientation of the image capturing apparatus and the obtained three-dimensional shape data of the object.

7. An image processing method comprising:
   obtaining three-dimensional shape data which represents a three-dimensional shape of an object based on images captured in a plurality of directions and includes a plurality of elements, and
   generate three-dimensional shape data which represents a three-dimensional shape of the object and does not include a target element, in a case where an absolute value of a difference between a distance specified by a position which corresponds to of the target element included in the obtained three-dimensional shape data and which is included in a distance image and a distance between an image capturing apparatus and the target element included in the obtained three-dimensional shape data of the object is larger than a threshold, the distance specified by the position included in the distance image representing a distance between the image capturing apparatus and an element positioned at a surface of the obtained three-dimensional shape data of the object.

8. The image processing method according to claim 7, wherein the obtained three-dimensional shape data representing the three-dimensional shape of the object is generated based on images representing a region of the object extracted from the images captured in the plurality of directions.

9. The image processing method according to claim 7, wherein the obtained three-dimensional shape data is data expressed by point cloud.

10. The image processing method according to claim 7, wherein the distance image is generated based on a position of the image capturing apparatus, an orientation of the image capturing apparatus and the obtained three-dimensional shape data of the object.

11. A non-transitory computer readable storage medium storing a program for causing a computer to execute a method, the method comprising:

obtaining three-dimensional shape data which represents a three-dimensional shape of an object based on images captured in a plurality of directions and includes a plurality of elements, and generate three-dimensional shape data which represents a three-dimensional shape of the object and does not include a target element, in a case where an absolute value of a difference between a distance specified by a position which corresponds to the target element included in the obtained three-dimensional shape data and which is included in a distance image and a distance between an image capturing apparatus and the target element included in the obtained three-dimensional shape data of the object is larger than a threshold, the distance specified by the position included in the distance image representing a distance between the image capturing apparatus and an element positioned at a surface of the obtained three-dimensional shape data of the object.

* * * * *